(12) United States Patent
Daniels

(10) Patent No.: US 6,798,514 B2
(45) Date of Patent: Sep. 28, 2004

(54) MEANS AND APPARATUS FOR ANALYSING AND FILTERING POLARIZED LIGHT AND SYNTHESIZING A SCENE IN FILTERED LIGHT

(76) Inventor: James Maurice Daniels, 40 Cranbury Rd., Princeton Junction, NJ (US) 08550

( * ) Notice: Subject to any disclaimer, the term of this patent is extended or adjusted under 35 U.S.C. 154(b) by 0 days.

(21) Appl. No.: 10/298,435

(22) Filed: Nov. 18, 2002

(65) Prior Publication Data

US 2003/0117624 A1 Jun. 26, 2003

Related U.S. Application Data

(60) Provisional application No. 60/338,854, filed on Dec. 1, 2001.

(51) Int. Cl.$^7$ ................................................. G01J 4/00
(52) U.S. Cl. ........................................................ 356/369
(58) Field of Search ................................. 356/364–369

(56) References Cited

U.S. PATENT DOCUMENTS

| | | | | |
|---|---|---|---|---|
| 5,726,755 | A | * 3/1998 | Wolff | 356/364 |
| 6,552,836 | B2 | * 4/2003 | Miller | 359/237 |
| 6,576,886 | B1 | * 6/2003 | Yao | 250/225 |
| 2003/0067602 | A1 | * 4/2003 | Patel et al. | 356/369 |
| 2003/0076493 | A1 | * 4/2003 | Olsson et al. | 356/327 |

OTHER PUBLICATIONS

Dirac, P.A.M. "Principles of Quantum Mechanics," 3rd. Ed. pp. 4–7 Oxford University Press, 1947.
Stone, J.M. "Radiation and Optics," pp. 313–317 McGraw Hill, 1954.
Daniels, J.M. "Optimum design of a polarimeter for visible light," Rev. Sci. Instrum. 57, 1570–1573 (1986).
Daniels, J.M., Hirvonen, M.T., Jauho, A.P., Katila, T.E. and Riski, K.J. "Inve4stigation of the magnetism of terbium ethylsulphate below 1 K using the Faraday effect," Phys. Rev. B11, 4409–4420 (1975).

* cited by examiner

Primary Examiner—Michael P. Stafira

(57) ABSTRACT

This device makes measurements of the intensity of light in four different polarizations, chosen for maximum accuracy and efficiency. In the "measuring head" the light passes through two liquid crystal waveplates and a polarizing filter before falling on a light sensitive element. Different interchangeable measuring heads, using this principle, can be made for different applications.

The device has electronic control and display circuits, coordinated by a microprocessor.

With a photodiode as the light sensitive element, the device is a portable stand alone polarimeter which displays the polarization parameters in whatever representation the operator chooses.

With a digital camera as the light sensitive element, the device produces four scenes which can be processed digitally and uploaded as a scene seen in any arbitrary polarization. Also, the unpolarized component can be filtered out; something impossible with physical filters placed before the lens.

3 Claims, 6 Drawing Sheets

MEANS AND APPARATUS FOR ANALYSING AND FILTERING POLARIZED LIGHT AND SYNTHESIZING A SCENE IN FILTERED LIGHT

CROSS REFERENCE

This application is entitled to the benefit of Provisional Patent Application 60/338,854 filed Dec. 1, 2001.

STATEMENT REGARDING FEDERALLY FUNDED RESEARCH

Not applicable.

BACKGROUND OF THE INVENTION

This invention comprises a method of automatically making a complete analysis of the polarization of light, and digitizing the four parameters which characterize it, all in real time, and a compact stand alone device to do this. This invention also calculates the parameters in several different representations, and displays them. The display could be numerical or pictorial at the choice of the operator.

Although the human eye is not sensitive to the polarization of light, polarization phenomena are ubiquitous in nature. For example, light reflected from many surfaces is partially polarized, and so is the blue sky. In the past, polarizing filters have been employed to exploit these phenomena, to the advantage of users. For example, for night driving, polarized spectacles have been used to eliminate the glare from headlights reflected from a wet pavement, and photographers have used a polarizing filter to reduce or eliminate reflections from windows. These are, however, relatively crude applications, limited in scope.

The use of a (generalized) polarization filter, e.g. in a surveillance camera, could improve contrast. The difficulty here is to know beforehand what filter to use. If it happens that the choice was not the best, there is no way of changing it after the event. Other disadvantages of the use of a single filter in this situation are: that it might be desirable to use different filters for different parts of the scene, and that no physical filter can cut out the unpolarized component of the light, since photons (light) obey the quantum mechanical rules of interaction with physical objects. [Paul Adrien Maurice Dirac. "Principles of Quantum Mechanics," 3rd. Ed. Pp. 4–7 Oxford University Press 1947]

An improvement on the traditional use of "fixed" filters can be made using liquid crystal waveplates, whose optical properties can be changed electrically, but the same two disadvantages—not knowing in advance, and the inability to eliminate the unpolarized component—still remain.

This invention describes a method to get around these difficulties by not throwing away any of the information concerning the polarization.

When it is desired to analyse the polarization of a light beam, traditionally four measurements are made of the intensity of light passed by four different "filters." This is traditionally done by placing a quarter wave plate and a polarizing filter in the beam in four different orientations [J. M. Stone. "Radiation and Optics." p.540 McGraw Hill, 1954]. A prescription for finding these parameters (e.g. Stokes' original prescription) can be followed automatically by rotating the various elements e.g. by a servo motor; the intensities are then measured in sequence. In order to avoid moving parts, the beam can be split and the measurements made at the four different exits.

The disadvantages of beam splitting are, first that it is bulky, and secondly there is a problem concerning the relative intensities of the split beams, and the relative sensitivities of the detectors. The disadvantages of moving elements are, firstly that mechanical vibration might upset the optical alignment, and secondly, if the beam goes through a different part of an optical element after it has been moved, the transmission might be different due to dirt and imperfections. If an element has to be inserted in the beam, as in Stokes' original prescription, there is a loss of light due to reflection at the surfaces of that element.

All automatic instruments offered to date to analyse the polarization of light require an external computer (e.g. a desktop or a laptop as a minimum) to do the necessary calculation of the polarization parameters. This is an expensive addition and makes the system not very portable. This invention will contain its own computer, a microprocessor, enabling it to be a truly portable stand alone instrument.

SUMMARY

In order to determine the complete state of polarization of light, four polarization states, against which the incident light is compared, are chosen in a manner to provide the maximum accuracy in the final parameters. They are also chosen so that a device can be constructed to access these four polarization states with maximum efficiency.

The light first passes through a $\lambda/2$ waveplate, next a $\lambda/3$ waveplate, and next a polarizing filter before falling on to a light sensitive element. The waveplates are liquid crystal waveplates which can be switched electrically between a birefringent and an isotropic state.

The device includes a control module, containing electronic circuits to actuate the waveplates, to process the output of the light sensitive element, a display screen to output the results, and a microprocessor to coordinate the operation of these elements.

The waveplates, polarizing filter and the light sensitive element comprise the measuring head; interchangeable measuring heads, designed for special purposes, can be connected to the control module.

With a photodiode as the light sensitive element, the instrument is a polarimeter; the parameters of the polarization can be displayed in whatever representation the operator selects. This is a portable stand alone polarimeter.

With a digital camera for the light sensitive element, the instrument produces four scenes which can be processed digitally to produce a scene as seen through any arbitrary polarizing filter. Such a filter is not limited to filters which can be realized physically. In particular, the unpolarized component of the light can be filtered out; this is not possible with physically realizable filter elements.

Objects and Advantages

This invention comprises a method of automatically making a complete analysis of the polarization of light, and digitizing the four parameters which characterize it, all in real time, and a compact stand alone device to do this. For use as e.g. a polarimeter, an ellipsometer or a saccharimeter, this stand alone device will have a screen to display the results of such a measurement in any one of several representations at the choice of the operator. It will have a port for connection to a computer so that, instead of being used only in the manual stand alone mode, it can be automatically operated by the computer as part of a larger system.

Embodiments are not limited to measuring the polarization of a single beam of light. Simultaneous measurements can be made on several spatially separated beams. For example, another application of this method of analysis of polarization is as a filter element to be placed in front of the lens of a digital camera, and each pixel is to be regarded as an independent light sensitive element. These four parameters of each pixel could then be stored and modified in a manner equivalent to the effect of a physical filter placed before the lens, and a scene synthesized from these modified parameters. This is a digital filter, and its advantages are that several different modifications can be made to the parameters, equivalent to different physical filters placed in front of the camera lens, and the choice of the best filter can be made after the picture is taken.

These modifications are not limited to mimicking a physical filter, since physical filters of light are restricted by the laws of measurement of quantum mechanics [Paul Adrien Maurice Dirac. "Principles of Quantum Mechanics," 3rd. Ed. Pp. 4–7 Oxford University Press 1947]. In particular, it is possible with this system to eliminate all, or part, of the unpolarized component of the light. No physical filter can eliminate the unpolarized component.

Other advantages are that it has no moving parts, and different interchangeable arrangements of the optical parts can be constructed for special purposes.

With the possibility of downloading special programs into the microcontroller, it is a truly versatile instrument.

LIST OF DRAWINGS

LIST OF REFERENCE NUMERALS

Figure 1:
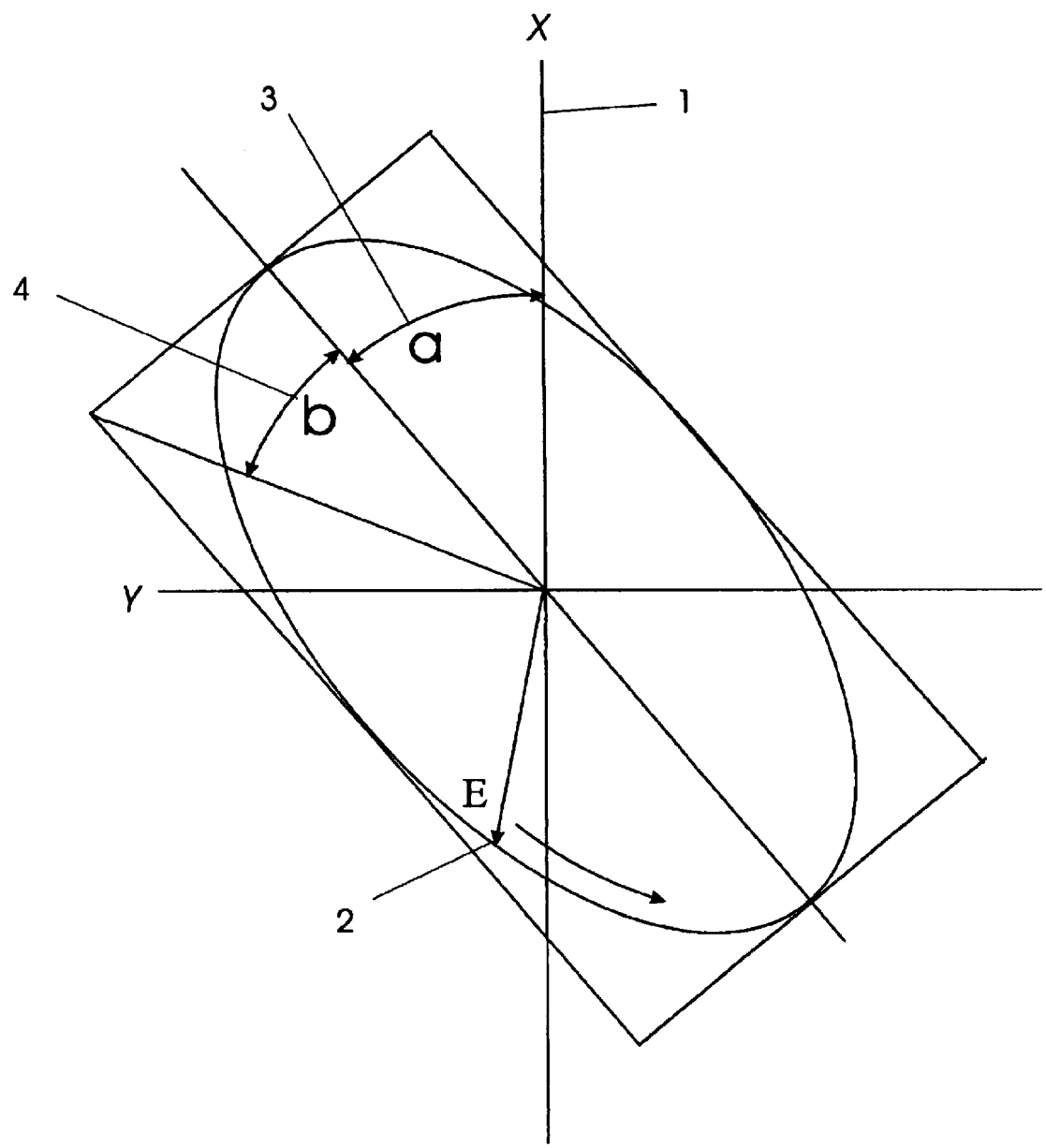
FIG. 1 is a diagram of the motion of the electric vector of elliptically polarized light, in a fixed plane, as seen by an observer looking towards the light source.

1. The reference direction for the description of the polarization.
2. The tip of the electric vector.
3. The angle defining the orientation of the ellipse.
4. The angle defining the opening of the ellipse.
8. The equator of the Poincaré sphere.
9. The point P which represents the state of polarization depicted in FIG. 1.
10. The points O, A, B and C representing the polarizations against which an unknown polarization is to be measured.
11. The diameter IJ representing the $\lambda/2$ waveplate.
12. The diameter AZ representing the $\lambda/3$ waveplate.
15. Liquid crystal waveplates.
16. Polarizing filter.
17. Lens to focus the transmitted light.
18. Photodetector.
21. Microcontroller (e.g. Parralax® Basic Stamp 2).
23. Digital control circuits.
25. Circuits for controlling the waveplates.
27. Preamplifier.
29. Gain control.
31. Overload warning light.
32. Button to reset on overload.
33. Serial input liquid crystal display.
35. On/off switch.
38. Wavelength adjust for the waveplates.
39. Serial port for communication with a computer.
41. Battery pack.
43. Oscillator.
45. Button to start a measurement.
46. One shot non-retriggerable multivibrator.
47. Binary counter/scaler.
49. Analog to digital converter.
51. Line carrying 2 kHz signal from oscillator.
53. Line carrying 32 Hz signal from oscillator.
65. Line carrying 16 Hz control signal for the $\lambda/2$ waveplate.
67. Line carrying 8 Hz control signal for the $\lambda/3$ waveplate.
69. Reset signal.

DESCRIPTION OF THE INVENTION:

In the preferred embodiment, the device consists of two parts: a measuring head, and a control module.

The measuring head consists of two liquid crystal waveplates (15), a polarizing filter (16) (e.g. a Polaroid®), and a light sensitive element (18) to measure the intensity of the incident light by converting it into an electrical signal. These elements are common to all embodiments. Said measuring head may also contain a lens or lenses (17), and other optical elements, to manipulate the incident light in the traditional manner, e.g. an iris diaphragm, and a shutter. Said liquid crystal waveplates (15) can be switched electrically between an isotropic state and a birefringent state. In this preferred embodiment, the light first passes through a waveplate with a retardance of $\lambda/2$ when in the birefringent state, then through a waveplate with a retardance of $\lambda/3$ when in the birefringent state, and then through said polarizing filter. It then falls on to said light sensitive element. If the objective is to make a polarimeter to measure the polarization of a beam of light, said light sensitive element would be preferably a photodiode (18) which produces a current proportional to the intensity of the incident light; if the objective is to produce a camera, said light sensitive element would be the charge coupled screen on to which the image is focused, and each pixel would be an independent light sensitive element. The choice of light sensitive elements is, however, not limited to these two. Since the retardance of waveplates (15) is determined by an electric signal, it can be adjusted electrically for the particular wavelength of light being examined. Said measuring head is connected to said control module by cable. Thus, said control module can be situated at any convenient location within reach of the cable. There can be several interchangeable measuring heads suitable for different tasks, all compatible with said control module.

Said control module contains some or all of:

A microprocessor (21), and software, to carry out all the tasks involved in making a measurement. Electrical circuits (23) to produce the waveforms for driving said waveplates (15), and for timing the sequence of operations to make said measurements. Electrical circuits to drive said waveplates (15), and a control knob (38) to adjust said waveplates (15) for the wavelength of light to be measured.

Input circuits—in the case of a polarimeter, a preamplifier (27), preferably with a manual gain control (29), an overload warning (31), and a reset button (45)—in the case of a camera, preferably random access memory to store the output from said digital camera (which is part of the measuring head).

A liquid crystal display screen (33) to display the results of a measurement, and a switch (43) to select the mode of display.

An on/off switch (35), and a button (37) to initiate a measurement.

A port (39) for communication with an external computer by cable or wireless. This is used to download software, and possibly for automatic as opposed to manual operation, and to upload the results of measurements when in automatic operation.

A battery pack (41) or a power pack.

Controls and indicators mounted on the panel include, but are not limited to, said on/off switch (35), lights (36) to indicate that the instrument is switched on, said overload warning light (31), said preamplifier gain control(29), said start button (37), said overload reset button (45) and said wavelength adjust (38). Also mounted on the panel (or on some other convenient place on the box) is the communication port(39). Also on the panel is a program selector switch (43) for the microprocessor (21). Said switch (43) selects programs in the microprocessor (21) which are to be executed, and can be used, according to what programs are installed, to choose between different modes of operation (e.g. one shot or continuous), or different modes of display of the results.

Said control module organizes the operations to make a measurement and evaluate the results in the following sequence:

Said microprocessor (21) is initially in a resting loop, waiting for a start signal which can come from a button (37) on the panel or from an external source.

An oscillator (43), driven by a 32,768 Hz crystal, produces a 2 kHz square wave on lead (51) and a 32 Hz square wave on lead (53). Said 2 kHz wave (51) is fed to said circuits (25) which drive said liquid crystal waveplates (15), and said 32 Hz wave is used to time the sequence of operations.

When said microprocessor (21) detects a start signal, and said overload is not actuated, it sends an enabling signal to said digital electronics—a one-shot multivibrator (46), a binary ripple counter (47), and an analogue to digital converter (49).

Figure 6:
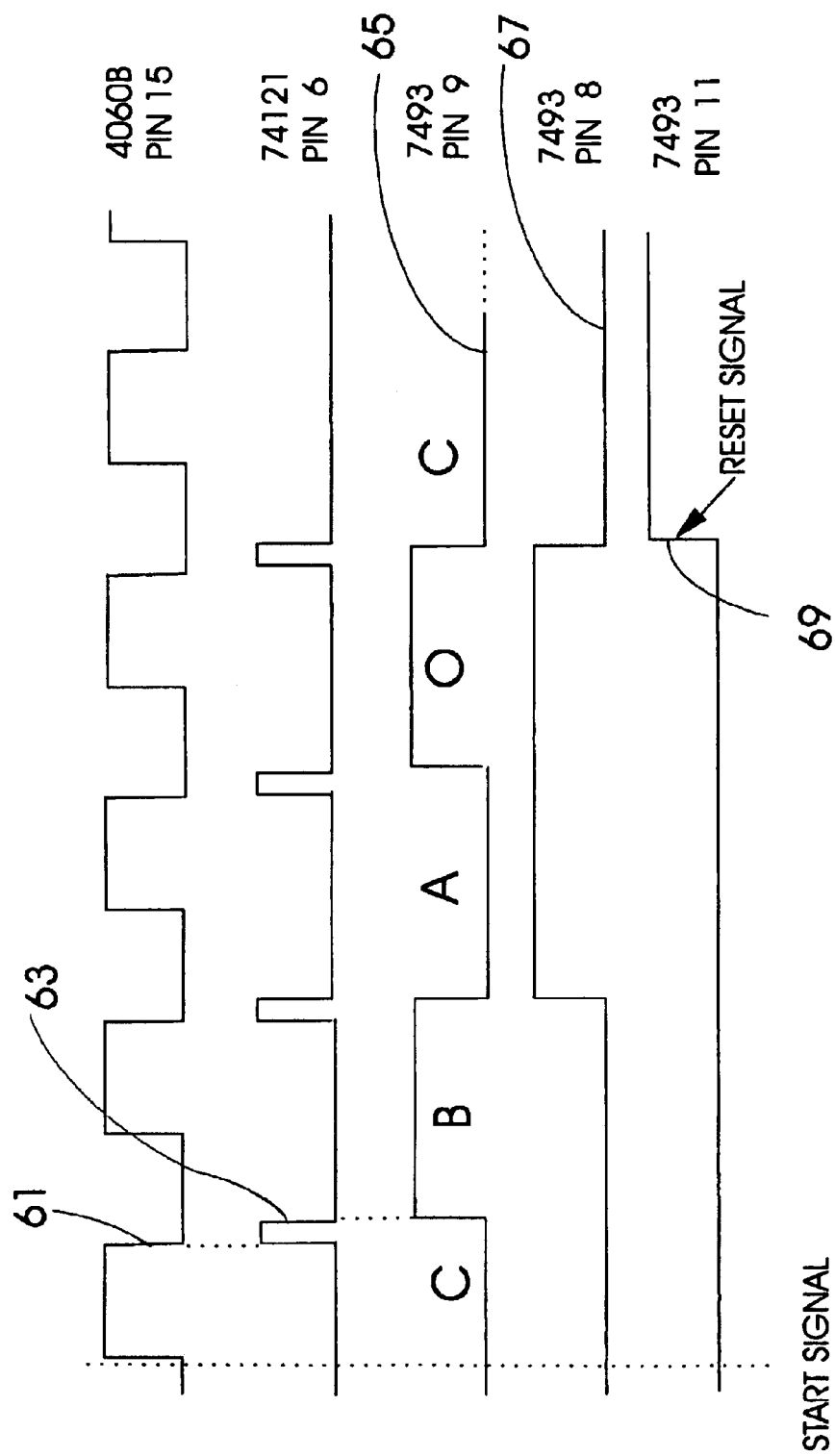
FIG. 6 is a diagram of the timing waveforms. The multivibrator and the counters are triggered by a falling edge.

The falling edge (61) of said 32 Hz wave triggers said multivibrator (46), which provides a positive signal for a time of about a millisecond during which the output of said preamplifier (27) is digitized and stored. The falling edge (63) of said signal from said multitivibrator (46) is the input to said binary ripple counter (47), the outputs of which are a 16 Hz, an 8 Hz and a 4 Hz square wave. The said 16 Hz square wave switches said $\lambda/3$ waveplate (15) between the birefringent (low) state and the isotropic (high) state. Said 8 Hz square wave similarly switches said $\lambda/2$ waveplate (15). The letters C, B, A and O on FIG. 6 denote the points on the Poincaré sphere (FIG. 2.) addressed at that time in the measurement sequence. The rising edge of said 4Hz wave signals said microprocessor (21) that the measurement sequence is over, and said microprocessor (21) then sends a reset signal to said binary counter (47) and a disable signal to said analogue to digital converter (49). The delay between consecutive signals from said multivibrator (46) provides a period for said liquid crystal waveplates (15) to come to equilibrium. This interval can be varied to fit the characteristics of said liquid crystal waveplates (15).

In the embodiment where the instrument is set up as a stand alone polarimeter, said microprocessor (21) then checks that overload has not occurred; if it has, it goes back to the initial waiting state; if not, it calculates the parameters of the polarization and sends these to said liquid crystal display (33). These calculations are simple arithmetic. It then goes back to the initial waiting loop.

The representation of the polarization is selected by the operator using a switch (43) on the panel; this selection includes, but is not limited to, the Stokes parameters, the elements of the Jones vector, the elements of the density matrix in photon spin space, the orientation and opening of the ellipse, and the unpolarized fraction. Changing the position of said switch initiates a recalculation of the parameters, pressing a button (37) sends said microprocessor (21) back to the initial waiting state.

Said microprocessor is programmed to evaluate the parameters of the polarization by means of the formulae outlined here:

Of the many ways in which the polarization can be represented, the most convenient and transparent is as a density matrix in photon spin space. In this representation the well known formalism of quantum mechanics is readily available. The density matrix, $\rho$, of the measured light is expressed as $$\rho = \begin{bmatrix} a+b & c-id \\ c+id & a-b \end{bmatrix}$$

and the elements of p are obtained from the measurements of light intensity, p, q, r and s, made at the points O, A, B and C respectively, using the following formulae:

$$a=(\tfrac{1}{4})(p+q+r+s)$$

$$b=(\sqrt{6}/4)(r-s)$$

$$c=(\tfrac{1}{4})(q+r+s-3p)$$

$$d=(\sqrt{2}/4)(2q-r-s)$$

The Stokes parameters, as commonly defined [J. M. Stone. "Radiation and Optics." p.540 McGraw Hill, 1954], are given by I=2a, V =2b, Q=-2c and U =2d.

The fraction of light which is completely polarized is $(1/a)\sqrt{(b^2+c^2+d^2)}$ where $$b^2+c^2+d^2=(9/16)\{4(p^2+q^2+r^2+s^2)-(p+q+r+s)^2\}$$

The angles $\alpha$ (3) and $\beta$ (4) are given by:

$$\tan 2\alpha=-d/c \text{ and } \sin 2\beta=b/\sqrt{(b^2+C^2+d^2)}$$

To filter out part or all of the unpolarized fraction, subtract from p an appropriate multiple of the unit matrix.

To find the intensity of light which would pass through a polarizing filter which passes light of a polarization represented by the angles $\alpha$ (3) and $\beta$ (4) of FIG. 1, calculate the trace of the product of $\rho$ with the density matrix representing light passed by this filter, which is $$\begin{bmatrix} (1/2)(1+\sin2\beta) & -\cos2\beta\,(\exp2i\alpha) \\ -\cos2\beta\,\exp(-2i\alpha) & (1-\sin2\beta) \end{bmatrix}$$

Principle of Operation:

The state of polarization of light is defined by four parameters (i.e. four real numbers). These were originally defined by George Stokes in 1851, with reference to determining the polarization of a beam of light, as the result of four prescribed measurements; the "Stokes parameters" as originally defined are still in use today. These measurements are made by placing certain optical elements—a polarizing filter (e.g. a Polaroid®) and a $\lambda/4$ plate in the beam, in various orientations, and measuring the intensity of the light transmitted [J. M. Stone. "Radiation and Optics." p.540 McGraw Hill, 1954]

There are other equivalent ways of describing the state of polarization, e.g. the Jones vector, and the orientation and opening of the polarization ellipse, however, the parameters of any such representation are a linear combination of the parameters of any other representation, and any one set is obtained from any other by a simple calculation.

The operation of this invention will now be illustrated with reference to its configuration as a polarimeter for determining the polarization of a beam of light.

The optical system through which the light passes consists, in this order, of two liquid crystal waveplates (15) and a filter (16) (e.g.a Polaroid®) which passes only plane polarized light. The light then falls on to a photodiode (18) which produces a current proportional to the intensity of the light.

A liquid crystal waveplate is a liquid crystal sandwiched between two glass plates. Its optical properties can be changed, e.g. from birefringent to isotropic, by applying an electrical signal. Such devices are commercially available, and their retardation can be adjusted electrically to suit the wavelength of the light to be examined.

Four measurements are made using the four combinations of birefringent and isotropic of the two waveplates. The control module will sequence these four configurations, and the output from each configuration will be accumulated in four separate channels. Since the final measure is obtained from a combination of these four measurements, it is equivalent to solving a set of simultaneous equations. For reliable results, these equations should be as well conditioned as possible. The method we have chosen to achieve this is best understood by reference to the Poincaré sphere FIG. 2.

FIG. 1 shows the general state of completely polarized light. x (1), y and z are a right hand set of Cartesian axes. The light propagates in the +z direction, and the figure shows the path of the electric vector, E, in a fixed (x-y) plane, as seen by an observer looking towards the source. In this most general state of (elliptic) polarization, the tip of the electric vector E (2) traces out an ellipse. The shape and orientation of the ellipse is defined by the two angles, α and β, where α (3) is the angle between the x direction (1) and the major axis of the ellipse, measured in an anticlockwise direction, and β (4) is the angle ($\leq 45°$) between the major axis and a diagonal of the circumscribing rectangle. It is measured from the major axis to the first diagonal encountered in the direction of rotation of E (2), and it is positive when measured in an anticlockwise direction. Although two parameters, α and β, define the state of polarization, three measurements are needed to account for the intensity of the light, and a fourth is needed because the light may be only partially polarized.

Figure 2:
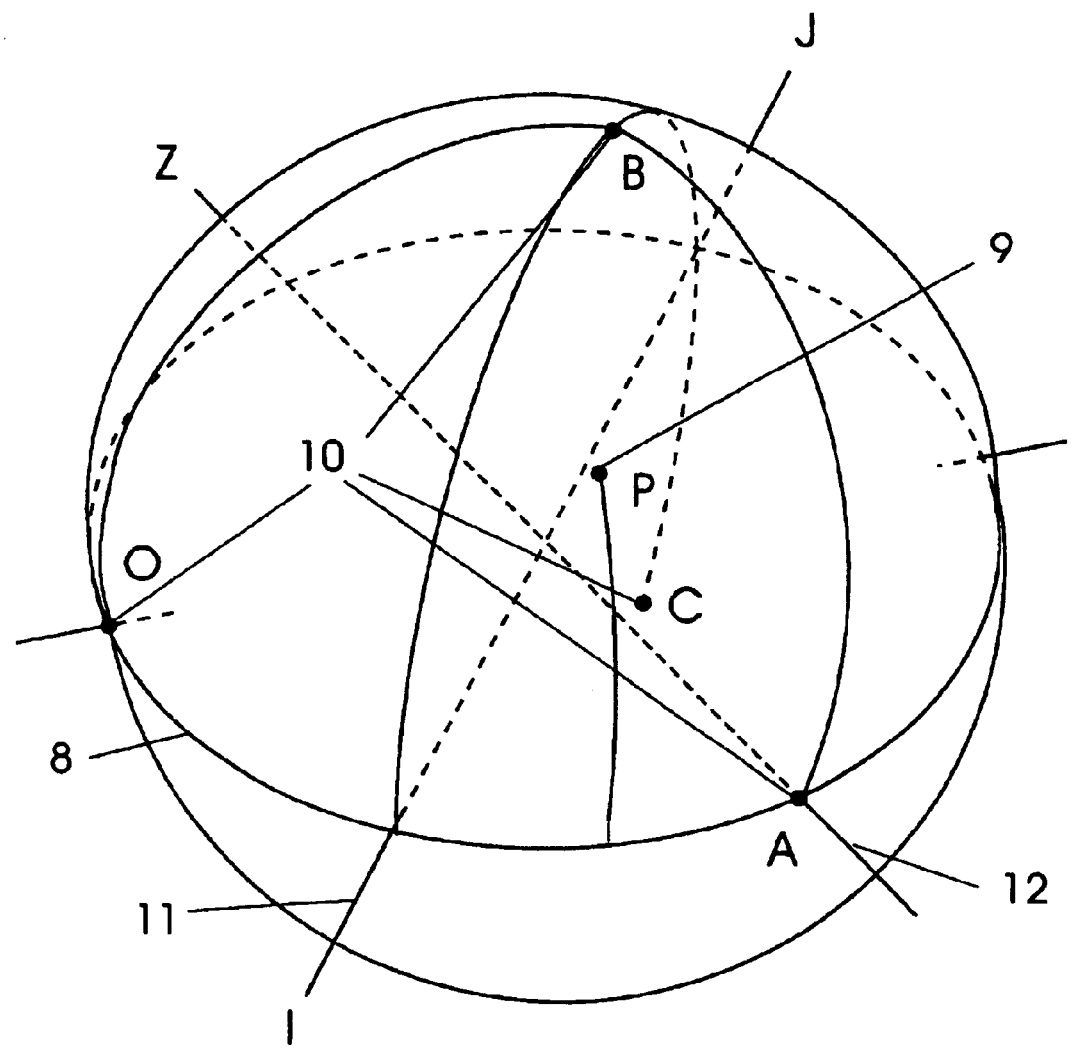
FIG. 2 is a diagram of the Poincaré sphere, showing on this sphere the mapping of the points representing the optical elements and the measurements.

These states of polarization can be mapped on to the surface of a sphere (the Poincaré sphere) FIG. 2. The state of elliptical polarization shown in FIG. 1 is represented by a point P (9) whose longitude is 2α and whose latitude is 2β. The properties of the Poincaré sphere which are relevant to the design of this instrument are:

(i) There are no special geometrical points on the sphere.
(ii) Orthogonal polarizations are represented by points at the ends of a diameter.
(iii) The equator represents plane polarized states.
(iv) The intensity fraction of light in a beam whose polarization is represented by the point P (9), which is passed by a filter which passes only light whose polarization is represented by the point O (10), is $\cos^2(\theta/2)$ where θ is the great circle distance between P (9) and O (10).
(v) The effect of a waveplate, which introduces a phase difference δ, is to rotate the sphere, through an angle δ, about a diameter whose endpoints represent the two orthogonal polarizations into which light, passing through the waveplate, is split.

To ensure that the equations which have to be solved are as well conditioned as possible, the four points O, A, B and C (10) against which the unknown polarization P (9) is to be compared, should be as far apart as possible, and this is accomplished by siting them at the vertices of a regular tetrahedron inscribed in the sphere. This principle has been enunciated by Daniels, and polarimeters (with moving parts) have been constructed using this principle [J. M. Daniels. Rev. Sci. Instrum. 57, 1570 (1986): J. M. Daniels, M. T. Hirvonen, A. P. Jauho, T. E. Katila and K. J. Riski. Phys. Rev. B11, 4409 (1975)]

The points chosen (10) are:
O at longitude 0° and latitude 0°,
A at longitude 109.47° and latitude 0°,
B at longitude 234.74° and latitude 54.74°,
and C at longitude 234.74° and latitude −54.74°.

The point O represents plane polarized light whose electric vector is parallel to the x (1) direction. It is the polarization which the instrument passes when both liquid crystal waveplates are in the isotropic state, and it is physically represented by a polarizing filter.

Although the effect of a waveplate is to change the polarization state of the light from being represented by the point P (9) to another point on the sphere, it is equivalent to say that the waveplate changes the polarization which is passed by the instrument as a whole. We therefore choose two waveplates which can, in various combinations, rotate the sphere so that A, B and C are brought to the position O. Since the ordinary and extraordinary rays of a waveplate are plane polarized, the ends of the diameters which represent these waveplates must lie on the equator.

This is accomplished by first putting a λ/2 waveplate with its axis at 27.37° to the x(1) axis. It is represented on the sphere by the diameter IJ (11); its effect on the sphere is to interchange A and O and, at the same time, to interchange B and C.

The other waveplate is a λ/3 plate whose axis is at an angle of 54.74° to the x(1) axis. It is represented on the sphere by the diameter AZ (12), and its effect on the sphere is to permute O, B, and C cyclically. Thus the two waveplates operating singly and together can bring A, B, and C to the point O. The light entering the instrument passes first through the λ/2 waveplate, next through the λ/3 waveplate, and finally through the polarizing filter.

First Preferred Embodiment

Figure 3:
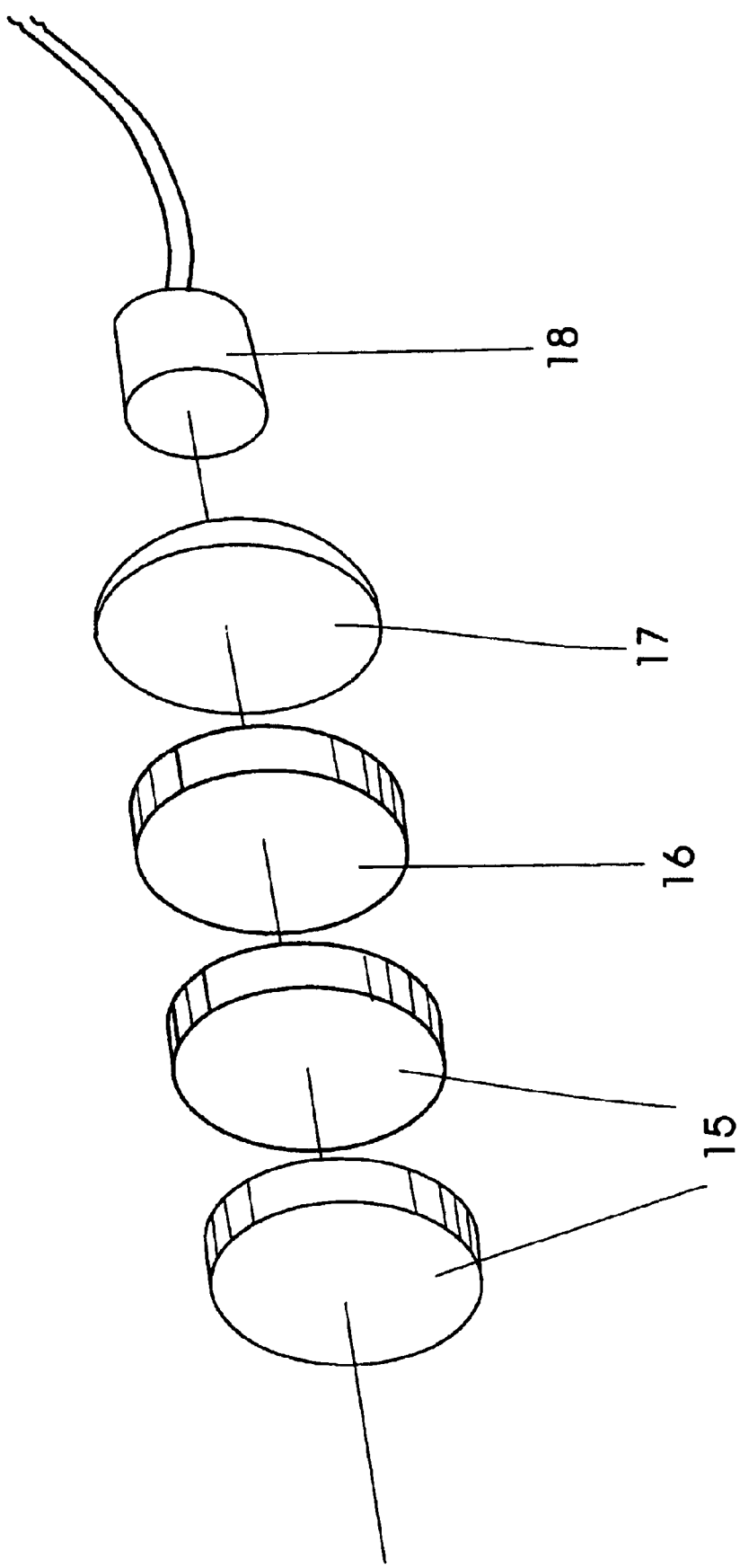
FIG. 3 shows an expanded view of one possible embodiment of a measuring head for a polarimeter.
Figure 4:
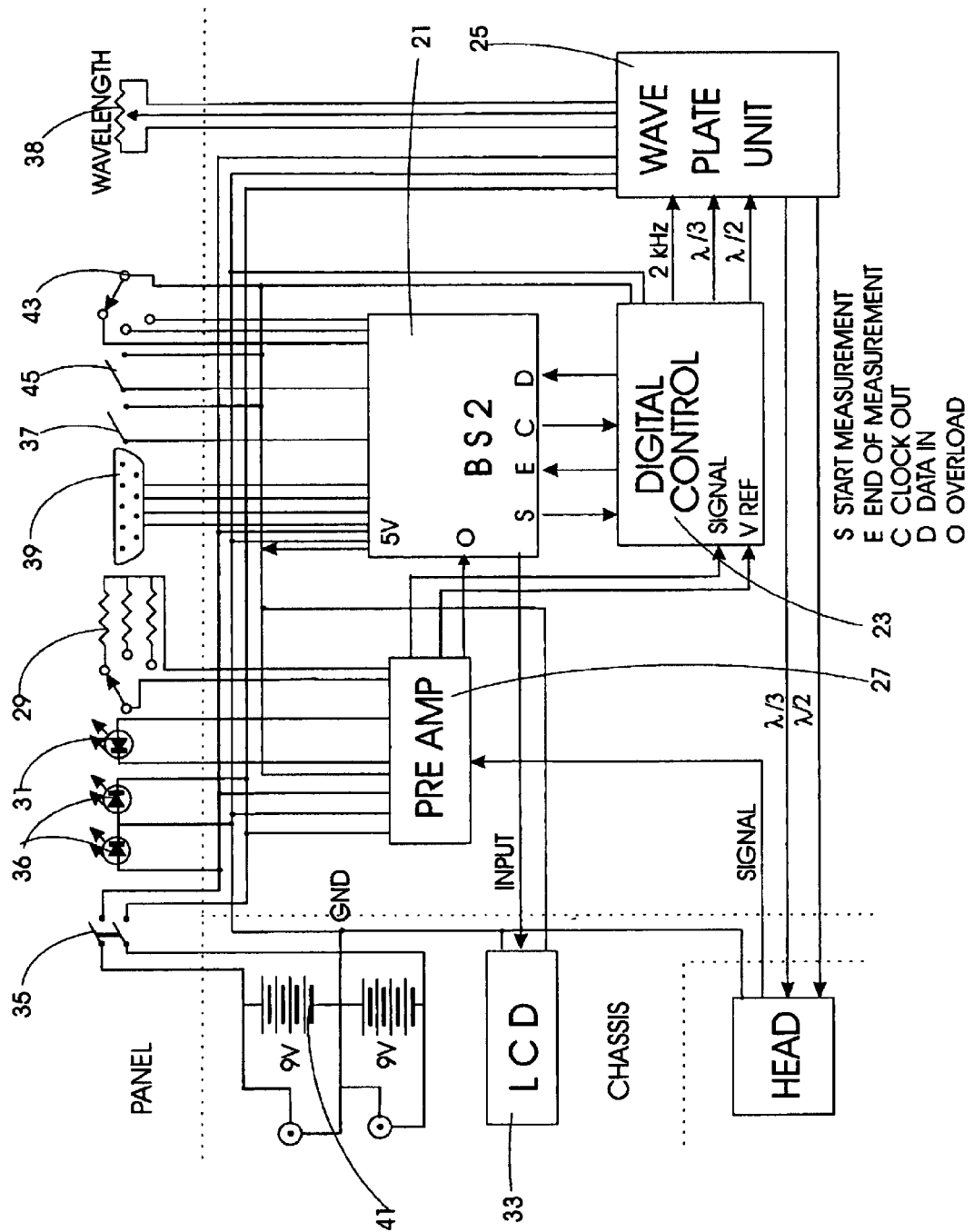
FIG. 4 is a block diagram showing the organization of the electronics.
Figure 5:
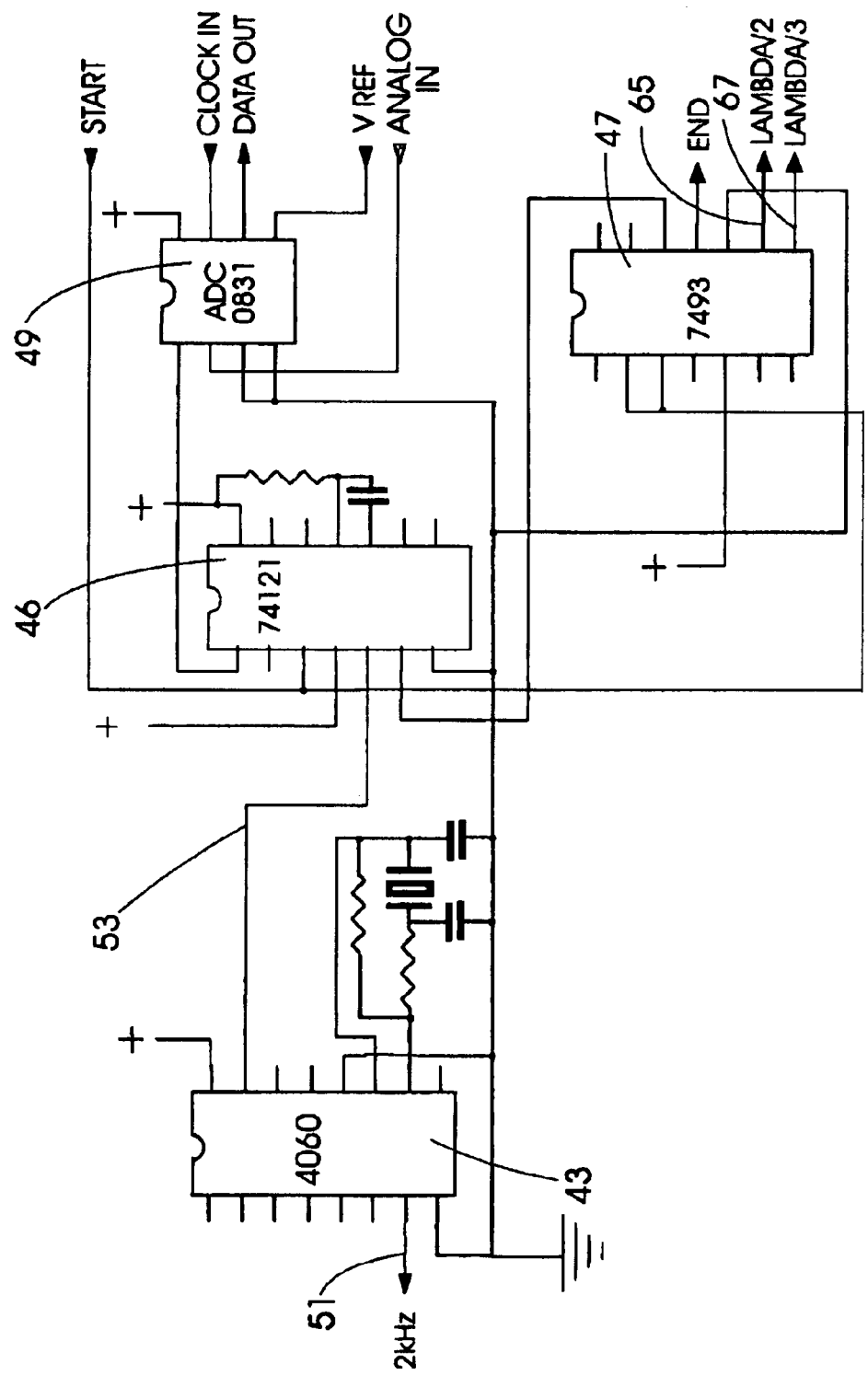
FIG. 5 is a circuit diagram of the digital control electronics.

This embodiment is for a polarimeter to be used as a general laboratory instrument. It is sketched in an expanded view in FIG. 3. The light travels from left to right in this figure. Said two liquid crystal waveplates (15), and said polarizing filter (16), are to be held in a metal tube in their correct orientations. A lens (17) focuses the light, assumed to be a parallel beam, on to said photodiode (18), mounted at the end of said tube. Cables connect said photodiode and said waveplates to said control module. Said tube will have fiduciary marks to define said x-axis (1) relative to which the polarization is measured, and an adaptor for mounting on an optical bench. It is preferred that said waveplates and said polarizing filter will be cemented together, as one unit, with index matching cement. Said control module will be a box, typically about six inches cube, containing said microprocessor (21) and associated circuits. Said panel will have said liquid crystal display (33), and manual controls, including but not limited to these:

To adjust the gain of said photodiode preamplifier (29).

An on/off switch (35).

Buttons to start (37) and reset (45) the operation.

To select the representation of the polarization parameters (43) which will be displayed on said liquid crystal display (33).

There will also be lights (31) warning of overload of said photodiode circuits, and (36) to show that the instrument is on. Said module will also have a port (39) for communication with an external computer, to download software, and for electronic communication with the external world. Said module may also contain a battery pack (41).

Second Preferred Embodiment.

The waveplates (15), and the polarizing filter (16), will be mounted together in a housing to fit in front of the lens of a digital camera. Said microprocessor (21) will control said waveplates (15) as in the first preferred embodiment, and will receive the output of said digital camera in the form of the digital representation of four scenes, taken in quick succession, with said waveplates (15) set to the points O, A, B and C (10). It will then upload these to wherever they are to be processed. The operation as a surveillance camera will be decided by the operator(s), and appropriate software will be downloaded to the microprocessor.

Conclusion, Ramifications and Scope of the Invention:

This invention describes an economical method of sampling the polarization of light. It does this in a manner to ensure maximum accuracy of any final result, with maximum simplicity in the process of measurement.

The maximum possible information on the polarization of the light is encoded in the four measurements which the invention makes on the light; any other particular information which may be desired can be obtained from these four measurements by a straightforward calculation.

The invention also contains electric circuits and a microprocessor with two functions—to operate the optical elements and to record the results of measurements. Thus, the complete state of polarization can be obtained in a fraction of a second by pressing a button.

Since the function of this invention is to analyse the polarization of light, it can be adapted to any situation where a knowledge of the polarization is required. It is not limited to the two embodiments already mentioned in detail.

The raw measurements are rarely useful, in themselves, for almost any application, and some calculation has to be done on them; this is in fact so for any polarization measuring instrument except one specially designed for some specific purpose. The internal computer—the microprocessor—can do these calculations, and programs can be downloaded for it to do calculations in addition to, or instead of, those which are part of the standard installation. For extensive data processing, the measurements can be uploaded to another computer; this would normally be the case for the embodiment as a digital camera mentioned above.

Calculations based on a complete knowledge of the state of polarization of light are not limited to expressing this state of polarization in various representations. Calculations can, in effect, simulate the results of hypothesized measurements on the light. Thus, the invention can be employed as a (digital) polarization filter. It is to be noted that these calculations are not limited to simulating filters which can be realized physically, and one such exception is the ability to remove the unpolarized component of the light. The embodiment as a filter for a digital camera is one example where this could be used to advantage.

In conclusion, this invention is a compact portable instrument to measure the polarization of light. It can be used as a stand alone instrument, or as part of a larger installation. It is extremely versatile, and its essential components enable it to be adapted to any situation involving polarized light.

I claim:

1. A means for automatically measuring the parameters which describe the polarization of light, and a device to make these measurements comprising (a) A $\lambda/2$ liquid crystal waveplate, (b) A $\lambda/3$ liquid crystal waveplate, (c) A polarizing filter, (d) A photosensitive element which produces an electric signal representing quantitatively the intensity of the light striking it, (e) Electric circuits to actuate said liquid crystal waveplates, (f) A liquid crystal display screen, (g) A microprocessor to control said electric circuits, to calculate the parameters of the polarization from said measurements, to display the results on said liquid crystal display screen, and, optionally, to transmit said parameters and/or said measurements to an external data processing unit, (h) Panel switches and other manual controls.

2. The device of claim 1 where said photosensitive element is a photodiode, the said device then being a polarimeter.

3. The device of claim 1 where said photosensitive element is a digital camera, and said waveplates and said polarizing filter are placed in front of the lens of said digital camera, functioning in the manner of a photographic filter, and where said microprocessor, or an external processor, synthesizes the scene as if viewed in light of any arbitrarily chosen polarization.

* * * * *